United States Patent
Ishimura et al.

(10) Patent No.: US 12,326,271 B2
(45) Date of Patent: Jun. 10, 2025

(54) AIR-CONDITIONING APPARATUS

(71) Applicant: Mitsubishi Electric Corporation, Tokyo (JP)

(72) Inventors: Shohei Ishimura, Tokyo (JP); Naofumi Takenaka, Tokyo (JP); Masakazu Kondo, Tokyo (JP); Yoshiyuki Tada, Tokyo (JP); Atsushi Kawashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 167 days.

(21) Appl. No.: 18/269,569

(22) PCT Filed: Feb. 1, 2021

(86) PCT No.: PCT/JP2021/003517
§ 371 (c)(1),
(2) Date: Jun. 26, 2023

(87) PCT Pub. No.: WO2022/162937
PCT Pub. Date: Aug. 4, 2022

(65) Prior Publication Data
US 2024/0053049 A1    Feb. 15, 2024

(51) Int. Cl.
*F24F 11/86*    (2018.01)
*F24F 11/87*    (2018.01)
(Continued)

(52) U.S. Cl.
CPC ............ *F24F 11/86* (2018.01); *F24F 11/871* (2018.01); *F24F 2110/12* (2018.01); *F24F 2140/20* (2018.01)

(58) Field of Classification Search
CPC ...... F24F 11/86; F24F 11/871; F24F 2110/12; F25B 2600/2513; F25B 2700/2117; F25B 2700/21175
See application file for complete search history.

(56) References Cited

U.S. PATENT DOCUMENTS 10,234,151 B2 *   3/2019   Yumoto ................. F25B 13/00
2008/0023563 A1   1/2008   Tamura

FOREIGN PATENT DOCUMENTS

CN   107339746 B   6/2020
JP   H06-40776 U   5/1994
(Continued)

OTHER PUBLICATIONS

International Search Report and Written Opinion mailed on Apr. 13, 2021, received for PCT Application PCT/JP2021/003517, filed on Feb. 1, 2021, 11 pages including English Translation.
(Continued)

*Primary Examiner* — Marc E Norman
(74) *Attorney, Agent, or Firm* — XSENSUS LLP

(57) ABSTRACT

Provided is an air-conditioning apparatus having a low-outside-air-temperature cooling operation mode including: a refrigerant circuit; an outdoor fan; an outdoor air temperature sensor; an indoor heat exchanger intermediate temperature sensor; an indoor heat exchanger outlet temperature sensor; and a controller configured to, when a measured value from the outdoor air temperature sensor is equal to or less than a predetermined value, perform the low-outside-air-temperature cooling operation mode, wherein in the low-outside-air-temperature cooling operation mode, the controller is configured to reduce a rotation speed of the outdoor fan, and to, when a difference between a measured value from the indoor heat exchanger outlet temperature sensor and a measured value from the indoor heat exchanger intermediate temperature sensor is equal to or greater than a first threshold, increase an opening degree of the pressure reducing device.

11 Claims, 9 Drawing Sheets

(51) Int. Cl.
  *F24F 11/871* (2018.01)
  *F24F 110/12* (2018.01)
  *F24F 140/20* (2018.01)

(56) References Cited

FOREIGN PATENT DOCUMENTS

| | | | |
|---|---|---|---|
| JP | H10-38387 A | 2/1998 | |
| JP | 2002-39598 A | 2/2002 | |
| JP | 2003-279110 A | 10/2003 | |
| JP | 2008025932 A * | 2/2008 | ............. F25B 13/00 |
| JP | 2009-109113 A | 5/2009 | |
| JP | 2010-101569 A | 5/2010 | |
| JP | 2016-061456 A | 4/2016 | |
| WO | 2018/221652 A1 | 12/2018 | |

OTHER PUBLICATIONS

Extended European Search Report dated Jan. 26, 2024 issued in corresponding European patent application No. 21922949.9, 10 pages.

* cited by examiner

AIR-CONDITIONING APPARATUS

CROSS-REFERENCE TO RELATED APPLICATION

The present application is based on PCT filing PCT/JP2021/003517, filed Feb. 1, 2021, the entire contents of which are incorporated herein by reference.

TECHNICAL FIELD

The present disclosure relates to an air-conditioning apparatus having a low-outside-air-temperature cooling operation mode.

BACKGROUND ART

In recent years, with an increase in the amount of heat generated from electronic equipment or improvements in the heat insulating properties of houses, there is an increasing demand for cooling operation in winter. In a low-outside-air-temperature cooling operation, a cooling operation is performed in a low outside air temperature environment and hence, heat exchange between air of low temperature and refrigerant is accelerated in an outdoor heat exchanger serving as a condenser. Therefore, refrigerant in a liquid state stagnates in the outdoor heat exchanger and hence, the amount of refrigerant in an indoor heat exchanger becomes deficient.

To eliminate a dry state of an indoor heat exchanger caused by a deficiency of refrigerant, there is a known configuration in which a solenoid valve and a bypass pipe that bypasses the solenoid valve are provided to a refrigerant pipe connected to the inlet of an outdoor heat exchanger. With such a configuration, an outdoor fan is stopped in the cooling operation performed in a low outside air temperature environment, so that heat exchange in the outdoor heat exchanger is suppressed and hence, a sufficient amount of refrigerant is supplied to the indoor heat exchanger. Further, Patent Literature 1 discloses a configuration in which, by operating a pressure reducing device or an outdoor fan according to the condensing temperature detected by a liquid-side temperature sensor in an outdoor heat exchanger and the saturated evaporating temperature detected by an intermediate temperature sensor in an indoor heat exchanger, refrigerant flowing through the outdoor heat exchanger is supplied to the indoor heat exchanger as much as possible.

CITATION LIST

Patent Literature

Patent Literature 1: Japanese Unexamined Patent Application Publication No. 2008-025932

SUMMARY OF INVENTION

Technical Problem

In the configuration provided with the bypass pipe, the solenoid valve of the refrigerant pipe and a fixed throttle of the bypass pipe form a refrigerant circuit and hence, it is impossible to adjust the amount of refrigerant that cycles through the refrigerant circuit. In Patent Literature 1, refrigerant is supplied based on only a condensing temperature and a saturated evaporating temperature and hence, an excess or a deficiency of refrigerant in the indoor heat exchanger cannot be precisely grasped. Therefore, a dry state of the indoor heat exchanger caused by a deficiency of refrigerant is not appropriately eliminated and hence, the saturated evaporating temperature reduces. Accordingly, frost adhering to the surface of the indoor heat exchanger freezes and, as a result, the cooling operation becomes unable to continue.

The present disclosure has been made to solve the above-mentioned problem, and it is an object of the present disclosure to provide an air-conditioning apparatus that can continue a stable cooling operation during a cooling operation in a low outside air temperature environment.

Solution to Problem

An air-conditioning apparatus according to an embodiment of the present disclosure includes: a refrigerant circuit in which a compressor, an outdoor heat exchanger, a pressure reducing device, and an indoor heat exchanger are connected in sequence by a pipe, and configured to allow refrigerant to cycle through the refrigerant circuit; an outdoor fan configured to send air to the outdoor heat exchanger; an outdoor air temperature sensor configured to measure a temperature of outside air; an indoor heat exchanger intermediate temperature sensor configured to measure a temperature of refrigerant flowing through an intermediate portion of the indoor heat exchanger; an indoor heat exchanger outlet temperature sensor configured to measure a temperature of refrigerant flowing through an outlet of the indoor heat exchanger; and a controller configured to, when a measured value from the outdoor air temperature sensor is equal to or less than a predetermined value, perform a low-outside-air-temperature cooling operation mode, wherein in the low-outside-air-temperature cooling operation mode, the controller is configured to reduce a rotation speed of the outdoor fan, and to, when a difference between a measured value from the indoor heat exchanger outlet temperature sensor and a measured value from the indoor heat exchanger intermediate temperature sensor is equal to or greater than a first threshold, increase an opening degree of the pressure reducing device.

Advantageous Effects of Invention

In the air-conditioning apparatus according to the embodiment of the present disclosure, a dry state of the indoor heat exchanger caused by a deficiency of refrigerant is determined from an increase in a difference between an indoor heat exchanger intermediate temperature and an indoor heat exchanger outlet temperature, and the opening degree of the pressure reducing device is then increased. Accordingly, stagnation of refrigerant in the outdoor heat exchanger is eliminated and hence, a stable cooling operation can be achieved in a low outside air temperature environment.

DESCRIPTION OF EMBODIMENTS

Figure 1:
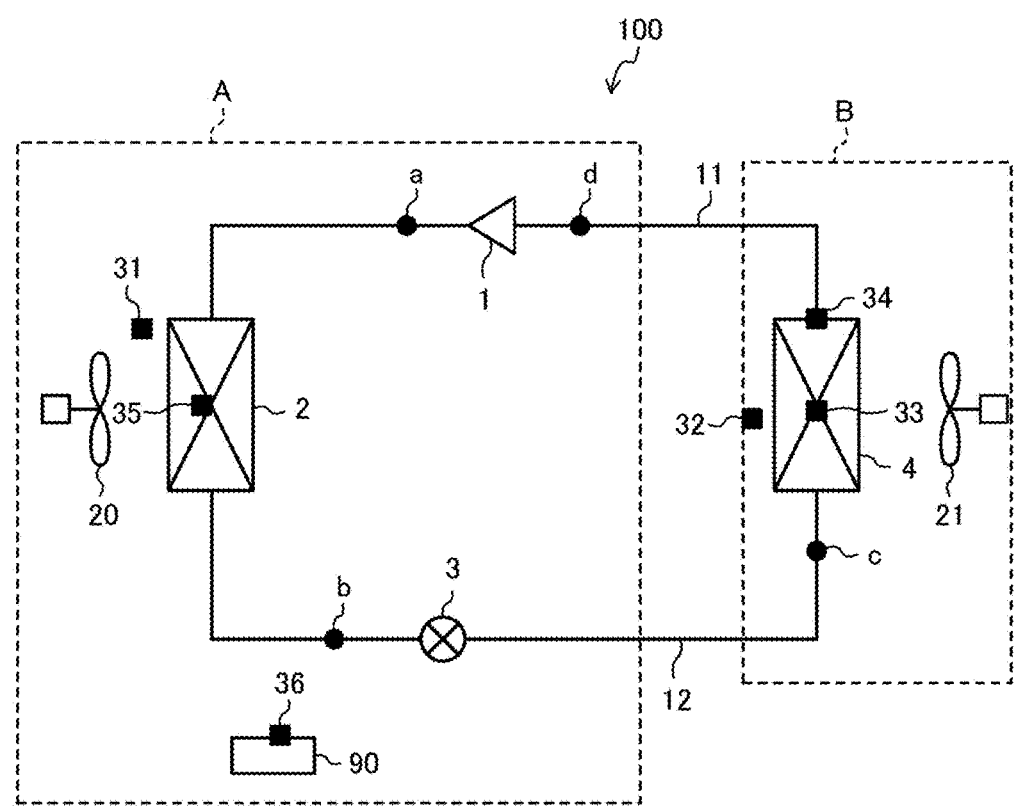
FIG. 1 is a circuit configuration diagram of an air-conditioning apparatus according to an embodiment.

Hereinafter, an air-conditioning apparatus 100 according to an embodiment will be described with reference to drawings. In the following drawings, the relative size relationships, shapes, and other aspects of respective constitutional components may differ from those of actual constitutional components. In the following drawings, components given the same reference symbols are identical or corresponding components, and the same goes for the entire description. Letters attached as suffixes to numerals used as reference symbols in the drawings may be omitted in the description. Further, to facilitate the understanding, terms indicating directions, such as, "up", "down", "right", "left", "front" and "rear", are suitably used. However, these terms indicating directions are used for the sake of convenience of description, and the arrangement and the direction of a device or a component are not limited by these terms.

<Configuration of Air-Conditioning Apparatus 100>

FIG. 1 is a circuit configuration diagram of the air-conditioning apparatus 100 according to the embodiment. As shown in FIG. 1, the air-conditioning apparatus 100 includes an outdoor unit A and an indoor unit B. The outdoor unit A suctions outside air, for example, performs heat exchange between the outside air and refrigerant, and then blows out the outside air. The indoor unit B suctions indoor air, performs heat exchange between the indoor air and refrigerant, and then blows out conditioned air. The outdoor unit A and the indoor unit B are connected to each other by a first extension pipe 11 and a second extension pipe 12.

A compressor 1, an outdoor heat exchanger 2, a pressure reducing device 3, and an indoor heat exchanger 4 are connected in sequence by pipes to form a refrigerant circuit. Refrigerant cycles through the refrigerant circuit. The air-conditioning apparatus 100 includes an outdoor fan 20, an outdoor air temperature sensor 31, an indoor heat exchanger intermediate temperature sensor 33, an indoor heat exchanger outlet temperature sensor 34, and a controller 90. The air-conditioning apparatus 100 also includes an indoor fan 21, an indoor temperature sensor 32, an outdoor heat exchanger intermediate temperature sensor 35, and a controller temperature sensor 36.

For refrigerant, a fluorocarbon refrigerant or an HFO refrigerant is used. Examples of a fluorocarbon refrigerant include R32 refrigerant, R125, R134a, R410A, R407c, and R404A, each of R32 refrigerant, R125, and R134a being an HFC refrigerant, each of R410A, R407c, and R404A being a mixed refrigerant obtained by combination of the above. Examples of an HFO refrigerant include HFO-1234yf, HFO-1234ze(E), and HFO-1234ze(Z). In addition to the above, for refrigerant, a refrigerant used in vapor compression heat pumps is used, such as a CO2 refrigerant, an HC refrigerant (a propane, an isobutane refrigerant, for example), an ammonia refrigerant, or a mixed refrigerant obtained by combining the above-mentioned refrigerants, such as a mixed refrigerant of R32 and HFO-1234yf.

<Outdoor Unit A>

The compressor 1, the outdoor heat exchanger 2, the pressure reducing device 3, and the outdoor fan 20 are housed in the outdoor unit A. The outdoor air temperature sensor 31, the controller 90, the outdoor heat exchanger intermediate temperature sensor 35, and the controller temperature sensor 36 are also housed in the outdoor unit A.

The compressor 1 suctions refrigerant in a low temperature and low pressure state, compresses the suctioned refrigerant into refrigerant in a high temperature and high pressure state, and then discharges the refrigerant. The action of the compressor 1 is controlled by the controller 90.

The outdoor heat exchanger 2 performs heat exchange between outside air and refrigerant, for example. The outdoor heat exchanger 2 serves as a condenser during a cooling operation, and serves as an evaporator during a heating operation. The outdoor heat exchanger 2 is a fin-and-tube heat exchanger formed by heat transfer tubes and heat transfer fins, for example. Refrigerant flows through the heat transfer tubes, the heat transfer tubes forming a refrigerant flow passage.

The pressure reducing device 3 has a variable throttle mechanism that can control flow resistance, such as an expansion valve. The pressure reducing device 3 is an electronic expansion valve in which the opening degree can be adjusted, for example. The opening degree of the pressure reducing device 3 is controlled by the controller 90.

The outdoor fan 20 is equipment that sends outside air to the outdoor heat exchanger 2. The rotational speed of the outdoor fan 20 is controlled by the controller 90.

The controller 90 controls operation actions of the outdoor unit A and the indoor unit B in response to control signals transmitted from a remote control not shown in the drawing, for example. The controller 90 has a function of measuring a time period, for example, includes a timer. FIG. 1 shows a configuration in which the controller 90 is disposed in the outdoor unit A. However, the place at which the controller 90 is disposed is not limited to the outdoor unit A. The controller 90 may be disposed in the indoor unit B, may be disposed in each of the outdoor unit A and the indoor unit B in a dispersed manner, or may be disposed in a place other than the outdoor unit A or the indoor unit B.

The controller 90 may be a central processing unit (also referred to as a CPU, a processing unit, an arithmetic unit, a microprocessor, a microcomputer, a processor, or a digital signal processor (DSP)), for example. The controller 90 includes a memory being a nonvolatile or volatile semiconductor memory, such as a random access memory (RAM), a read only memory (ROM), a flash memory, an erasable programmable read only memory (EPROM), or an electrically erasable programmable read only memory (EEPROM), a magnetic disk, a flexible disk, an optical disc, a compact disc, a mini disc, or a digital versatile disk (DVD), for example. The controller 90 achieves processing by executing a program stored in the memory.

The outdoor air temperature sensor 31 measures the temperature of outside air. The outdoor heat exchanger intermediate temperature sensor 35 measures the temperature of refrigerant flowing through the intermediate position of the refrigerant flow passage of the outdoor heat exchanger 2. The intermediate position of the refrigerant flow passage of the outdoor heat exchanger 2 is an intermediate position of the distance of the refrigerant flow passage that ranges from the inlet to the outlet of the flow passage of the outdoor heat exchanger 2. For example, the intermediate position of the refrigerant flow passage of the outdoor heat exchanger 2 is the intermediate portion of the refrigerant flow passage of the outdoor heat exchanger 2 when the refrigerant flow passage is divided into three portions. The outdoor heat exchanger intermediate temperature sensor 35 is attached to the surface of a heat transfer tube that is at the intermediate position of the refrigerant flow passage of the outdoor heat exchanger 2, for example. The controller temperature sensor 36 measures the temperature of the controller 90. The controller temperature sensor 36 is provided to monitor the surface temperature of a heat generating body, such as an inverter switching element disposed in the controller 90. The controller temperature sensor 36 is attached to the substrate of the controller 90, for example. Measured values measured by the outdoor air temperature sensor 31, the outdoor heat exchanger intermediate temperature sensor 35, and the controller temperature sensor 36 are transmitted to the controller 90.

<Indoor Unit B>

The indoor heat exchanger 4 and the indoor fan 21 are housed in the indoor unit B. The indoor heat exchanger intermediate temperature sensor 33, the indoor heat exchanger outlet temperature sensor 34, and the indoor temperature sensor 32 are also housed in the indoor unit B.

The indoor heat exchanger 4 performs heat exchange between indoor air and refrigerant. The indoor heat exchanger 4 serves as an evaporator during a cooling operation, and serves as a condenser during a heating operation. In the same manner as the outdoor heat exchanger 2, the indoor heat exchanger 4 is a fin-and-tube heat exchanger formed by heat transfer tubes and heat transfer fins, for example. Refrigerant flows through the heat transfer tubes, the heat transfer tubes forming a refrigerant flow passage.

The indoor fan 21 is equipment that sends indoor air to the indoor heat exchanger 4. The rotational speed of the indoor fan 21 is controlled by the controller 90.

The indoor heat exchanger intermediate temperature sensor 33 measures the temperature of refrigerant flowing through the intermediate position of the refrigerant flow passage of the indoor heat exchanger 4. The intermediate position of the refrigerant flow passage of the indoor heat exchanger 4 is an intermediate position of the distance of the refrigerant flow passage that ranges from the inlet to the outlet of the refrigerant flow passage of the indoor heat exchanger 4. For example, the intermediate position of the refrigerant flow passage of the indoor heat exchanger 4 is the intermediate portion of the refrigerant flow passage of the outdoor heat exchanger 2 when the refrigerant flow passage is divided into three portions. The indoor heat exchanger intermediate temperature sensor 33 is attached to the surface of a heat transfer tube that is at the intermediate position of the refrigerant flow passage of the indoor heat exchanger 4, for example.

The indoor heat exchanger outlet temperature sensor 34 measures the temperature of refrigerant, in a refrigerant flow during a cooling operation, flowing through the outlet position of the refrigerant flow passage of the indoor heat exchanger 4. The outlet position of the refrigerant flow passage of the indoor heat exchanger 4 is a portion of the refrigerant flow passage that is close to the outlet when the refrigerant flow passage of the indoor heat exchanger 4 is divided into three portions and the indoor heat exchanger 4 serves as an evaporator, for example. The indoor heat exchanger outlet temperature sensor 34 is attached to the surface of a heat transfer tube that is at the outlet of the refrigerant flow passage of the indoor heat exchanger 4, for example.

The indoor temperature sensor 32 measures the temperature of air in a room in which the indoor unit B is disposed. The indoor temperature sensor 32 is, for example, attached to an air inlet not shown in the drawing of the indoor unit B, the air inlet being formed in the indoor unit B to suction indoor air.

Measured values measured by the indoor heat exchanger intermediate temperature sensor 33, the indoor heat exchanger outlet temperature sensor 34, and the indoor temperature sensor 32 are transmitted to the controller 90.

<Operation Mode of Air-Conditioning Apparatus 100>

The air-conditioning apparatus 100 has operation modes including a normal cooling operation mode and a low-outside-air-temperature cooling operation mode. The low-outside-air-temperature cooling operation mode is an operation mode performed for eliminating stagnation of refrigerant in the outdoor heat exchanger 2 in the case in which the outside air temperature is low. Switching of the operation modes of the air-conditioning apparatus 100 is controlled by the controller 90.

<State of Refrigerant in Normal Cooling Operation Mode>

Figure 2:
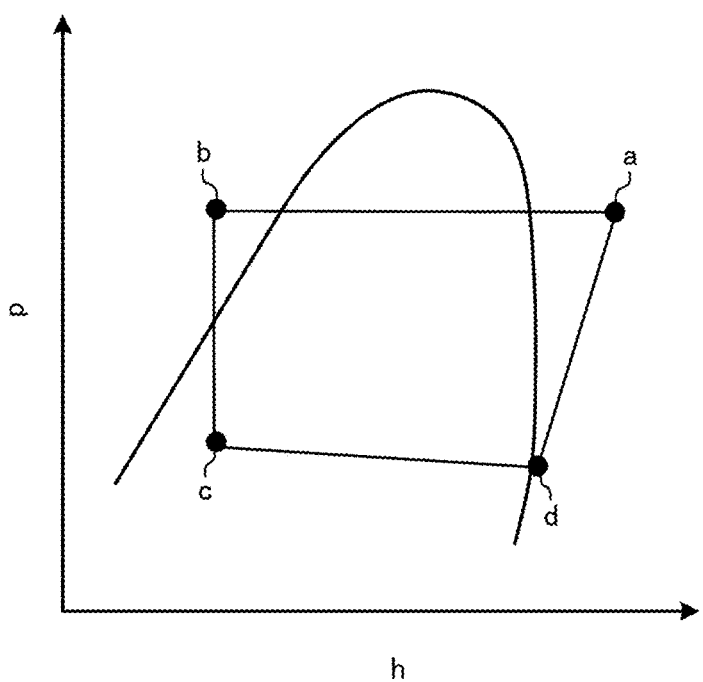
FIG. 2 is a p-h diagram for the air-conditioning apparatus according to the embodiment in a normal cooling operation mode.

FIG. 2 is a p-h diagram for the air-conditioning apparatus 100 according to the embodiment in the normal cooling operation mode. In FIG. 2, pressure p is shown on the vertical axis, and enthalpy h is shown on the horizontal axis. Further, point (a) to point (d) in FIG. 2 show states of refrigerant at positions of point (a) to point (d) in FIG. 1.

During the normal cooling operation, the outdoor heat exchanger 2 serves as a condenser. When the compressor 1 starts the operation, gas refrigerant of low temperature and low pressure is compressed by the compressor 1 into gas refrigerant of high temperature and high pressure, and is then discharged. In this case, as shown by a line extending from point (d) to point (a) in FIG. 2, refrigerant is compressed by a compression process of the compressor 1 such that the refrigerant is heated more by an amount corresponding to heat insulation efficiency of the compressor 1 compared with a case in which refrigerant is compressed adiabatically along the isentropic line.

The gas refrigerant of high temperature and high pressure that is discharged from the compressor 1 flows into the outdoor heat exchanger 2, serving as a condenser, and transfers heat to outside air, thus being cooled to become liquid refrigerant of intermediate temperature and high pressure. In this case, the state of refrigerant changes in the outdoor heat exchanger 2 as shown by a substantially horizontal straight line extending from point (a) to point (b) in FIG. 2.

The liquid refrigerant of intermediate temperature and high pressure that flows out from the outdoor heat exchanger 2 flows into the pressure reducing device 3, and is throttle-expanded and reduced in pressure in the pressure reducing device 3 to become two-phase gas-liquid refrigerant of low temperature and low pressure. In the pressure reducing device 3, refrigerant is changed with a fixed enthalpy h. The state change of refrigerant in this case is shown by a vertical line extending from point (b) to point (c) in FIG. 2.

The two-phase gas-liquid refrigerant of low temperature and low pressure that flows out from the pressure reducing device 3 flows into the indoor heat exchanger 4, serving as an evaporator, and cools indoor air, thus being heated to become gas refrigerant of low temperature and low pressure. Considering a pressure loss, change of refrigerant in the indoor heat exchanger 4 is shown by a slightly inclined substantially horizontal straight line extending from point (c) to point (d) in FIG. 2.

The gas refrigerant of low temperature and low pressure that flows out from the indoor heat exchanger 4 flows into the compressor 1, and is compressed again in the compressor 1. Note that the air-conditioning apparatus 100 can also perform a normal heating operation mode. In the normal heating operation mode, the outdoor heat exchanger 2 serves as an evaporator, the indoor heat exchanger 4 serves as a condenser, and the direction in which refrigerant cycles is set to the direction opposite to the direction in the normal cooling operation mode by a four-way valve or other components, and a similar air-conditioning operation is performed.

<State of Refrigerant in the Case in which Outside Air Temperature is Low>

Figure 3:
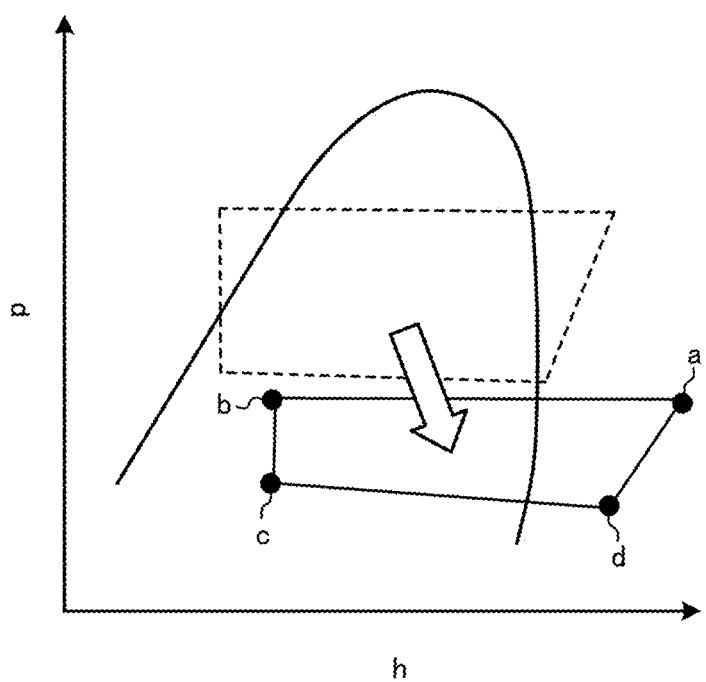
FIG. 3 is a p-h diagram for the air-conditioning apparatus according to the embodiment in the case in which the outside air temperature is low.

FIG. 3 is a p-h diagram for the air-conditioning apparatus 100 according to the embodiment in the case in which the outside air temperature is low. In FIG. 3, pressure p is shown on the vertical axis, and enthalpy h is shown on the horizontal axis. Point (a) to point (d) in FIG. 3 show the states of refrigerant at positions of point (a) to point (d) in FIG. 1. In FIG. 3, a solid line indicates a p-h diagram in the case in which the outside air temperature is low, and a broken line indicates a p-h diagram in the normal cooling operation mode.

The description will be made for the state of refrigerant when the cooling operation mode is performed in the case in which the outside air temperature is low. In the case in which the outside air temperature is low, the state of refrigerant of high temperature and high pressure changes as shown by a line extending from point (a) to point (b) in FIG. 3 in the outdoor heat exchanger 2 serving as a condenser. In this case, in the outdoor heat exchanger 2, heat exchange between refrigerant of high temperature and high pressure and outside air is accelerated and hence, liquid refrigerant stagnates in the outdoor heat exchanger 2. The case in which the outside air temperature is low refers to a case in which the outside air temperature is 18 degrees C. or less, for example.

Liquid refrigerant has a higher density than gas refrigerant and hence, when liquid refrigerant stagnates in the outdoor heat exchanger 2, the volume of gas refrigerant having a lower density than liquid refrigerant increases in the indoor heat exchanger 4. Gas refrigerant has a lower heat transfer rate than two-phase refrigerant and hence, in the cooling operation mode in the case in which the outside air temperature is low, the saturated evaporating temperature of refrigerant within a range from point (c) to point (d) in FIG. 3 reduces.

As a result, since refrigerant is two-phase refrigerant at the inlet position of the refrigerant flow passage of the indoor heat exchanger 4, the temperature of the refrigerant at the inlet position of the refrigerant flow passage of the indoor heat exchanger 4 is lower than that in the case in which the outside air temperature is not low. Further, immediately after two-phase refrigerant flows into the indoor heat exchanger 4, the two-phase refrigerant that flows into the indoor heat exchanger 4 evaporates to become gas refrigerant and hence, the temperature of the refrigerant rises.

That is, in the case in which the outside air temperature is low, refrigerant becomes deficient in the indoor heat exchanger 4 due to stagnation of refrigerant in the outdoor heat exchanger 2, and two-phase refrigerant that flows into the indoor heat exchanger 4 immediately becomes gas refrigerant, so that a saturated evaporating temperature reduces. Accordingly, frosting or freezing of moisture from indoor air occurs in the vicinity of the inlet of the indoor heat exchanger 4. Further, in the normal operation mode, due to a deficiency of refrigerant in the indoor heat exchanger 4, the temperature of refrigerant rises from the inlet position toward the outlet position of the refrigerant flow passage of the indoor heat exchanger 4, and the temperature of refrigerant asymptotically approaches the indoor temperature in the vicinity of the intermediate portion of the indoor heat exchanger 4. For this reason, heat exchange is not sufficiently performed and hence, cooling capacity becomes deficient.

In view of the above, the air-conditioning apparatus 100 has operation modes including the low-outside-air-temperature cooling operation mode in addition to the normal cooling operation mode, the low-outside-air-temperature cooling operation mode being an operation mode performed for eliminating stagnation of refrigerant in the outdoor heat exchanger 2 in the case in which the outside air temperature is low.

<Normal Cooling Operation Mode>

The normal cooling operation mode is an operation mode that is performed by the controller 90 when the measured value from the outdoor air temperature sensor 31 is greater than a predetermined value. In the normal cooling operation mode, for example, the compressor 1, the pressure reducing device 3, and the outdoor fan 20 or the indoor fan 21 are controlled such that the temperature of conditioned air to be supplied from the indoor unit B takes a set temperature. It is sufficient for the controller 90 to have a configuration that performs control during the normal cooling operation by a known control method.

<Low-Outside-Air-Temperature Cooling Operation Mode>

The low-outside-air-temperature cooling operation mode is an operation mode that is performed when, in the normal cooling operation mode, a measured value T31 from the outdoor air temperature sensor 31 is equal to or less than a control start temperature $T_{out}1$, which is a predetermined value. Actions in the low-outside-air-temperature cooling operation mode are controlled by the controller 90. In the low-outside-air-temperature cooling operation mode, the outdoor fan 20 and the pressure reducing device 3 are controlled by a control method different from that used in the normal cooling operation mode. The low-outside-air-temperature cooling operation mode ends after a lapse of a first time period t1 from when a state is established in which the measured value T31 from the outdoor air temperature sensor 31 is greater than the control start temperature $T_{out}1$. Thereafter, the normal cooling operation mode is started.

<Control of Outdoor Fan 20>

First, a method for controlling the outdoor fan 20 will be described. In the low-outside-air-temperature cooling operation mode, the outdoor fan 20 is controlled such that the rotation speed of the outdoor fan 20 is reduced according to the measured value from the outdoor air temperature sensor 31. With such control, efficiency of heat exchange between refrigerant and outside air is reduced and hence, stagnation of refrigerant in the outdoor heat exchanger 2 is suppressed.

Figure 4:
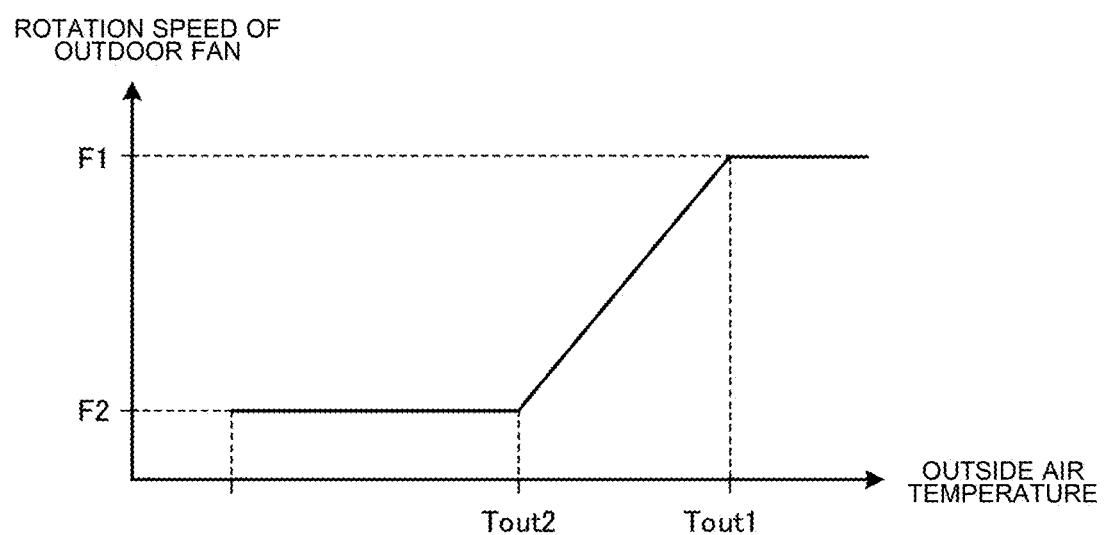
FIG. 4 is a graph showing the relationship between temperature of outside air and rotation speed of an outdoor fan in the air-conditioning apparatus according to the embodiment.

FIG. 4 is a graph showing the relationship between temperature of outside air and rotation speed of the outdoor fan 20 in the air-conditioning apparatus 100 according to the embodiment. In FIG. 4, the rotation speed of the outdoor fan 20 is shown on the vertical axis, and outside air temperature is shown on the horizontal axis. As shown in FIG. 4, in the low-outside-air-temperature cooling operation mode, the outdoor fan 20 is controlled such that the rotation speed of the outdoor fan 20 is changed as expressed by the following Formula 1 and Formula 2 according to the measured value T31 from the outdoor air temperature sensor 31.

In the low-outside-air-temperature cooling operation mode, when the measured value T31 from the outdoor air temperature sensor 31 is equal to or less than the control start temperature $T_{out}1$ and greater than a fan rotation speed lower limit temperature $T_{out}2$, a rotation speed Fout of the outdoor fan 20 is controlled based on Formula 1.

[Formula 1]

$$Fout = \frac{F1 - F2}{T_{out}1 - T_{out}2} \times T1 + \frac{T_{out}1 \times F2 - T_{out}2 \times F1}{T_{out}1 - T_{out}2} \quad (1)$$

In Formula 1, the control start fan rotation speed F1 [rpm] is the rotation speed of the outdoor fan at the time when the low-outside-air-temperature cooling operation mode is started. Further, the lower limit fan rotation speed F2 [rpm] is the lowest allowed value of the rotation speed Fout of the outdoor fan 20.

In the low-outside-air-temperature cooling operation mode, when the measured value T31 from the outdoor air temperature sensor 31 is equal to or less than the fan rotation speed lower limit temperature $T_{out}2$, the outdoor fan 20 is controlled such that the rotation speed Fout of the outdoor fan 20 takes the lower limit fan rotation speed F2 based on Formula 2. The lower limit fan rotation speed F2 is set for the purpose of maintaining the flow of air, thus allowing cooling of a heat generating body, such as an inverter switching element, included in the controller 90 of the outdoor heat exchanger 2, for example.

[Formula 2]

$$Fout = F2 \quad (2)$$

As described above, by controlling the outdoor fan 20 such that the rotation speed Fout of the outdoor fan 20 is reduced according to the measured value T31 from the outdoor air temperature sensor 31, efficiency of heat exchange between outside air and refrigerant flowing through the outdoor heat exchanger 2 is reduced and hence, stagnation of refrigerant in the outdoor heat exchanger 2 is suppressed.

Control of the rotation speed Fout of the outdoor fan 20 based on the measured value T31 from the outdoor air temperature sensor 31 is repeated each time a second time period t2 elapses. With such a configuration, the rotation speed Fout of the outdoor fan 20 is continuously reduced. The second time period t2 is 30 minutes, for example.

In the low-outside-air-temperature cooling operation mode, when a measured value T35 from the outdoor heat exchanger intermediate temperature sensor 35 is greater than a threshold TH_h1 of an outdoor heat exchanger intermediate temperature, the outdoor fan 20 is controlled such that the rotation speed Fout of the outdoor fan 20 is raised. With such control, there is no possibility of an extreme reduction in the rotation speed Fout of the outdoor fan 20 and hence, the possibility that high pressure, that is, rising of pressure p from point (a) to point (b) in FIG. 2, causes the unit to be forcibly stopped for protection of the unit is reduced. The threshold TH_h1 of the outdoor heat exchanger intermediate temperature is one example of the fourth threshold.

In the low-outside-air-temperature cooling operation mode, when a measured value T36 from the controller temperature sensor 36 is greater than a threshold TH_h2 of a controller temperature, the outdoor fan 20 is controlled such that the rotation speed Fout of the outdoor fan 20 is raised. With such control, the possibility that the temperature of the controller 90 rises with a reduction in the rotation speed Fout of the outdoor fan 20, leading to runaway of control performed by the controller 90 is reduced. The threshold of the controller temperature is one example of the fifth threshold.

In the case in which the measured value T35 from the outdoor heat exchanger intermediate temperature sensor 35 is greater than the threshold TH_h1 of the outdoor heat exchanger intermediate temperature after a lapse of a third time period t3 from when the rotation speed Fout of the outdoor fan 20 is raised, the outdoor fan is further controlled such that the rotation speed Fout of the outdoor fan 20 is raised again. In the same manner, in the case in which the measured value T36 from the controller temperature sensor 36 is greater than the threshold TH_h2 of the controller temperature after a lapse of the third time period t3 from when the rotation speed of the outdoor fan 20 is raised, the outdoor fan is controlled such that the rotation speed Fout of the outdoor fan is raised again. In this case, the third time period t3 is a time period that is shorter than the second time period t2.

<Control of Pressure Reducing Device 3>

Next, a method for controlling the pressure reducing device 3 will be described. In the low-outside-air-temperature cooling operation mode, when the opening degree of the pressure reducing device 3 is increased, refrigerant stagnating in the outdoor heat exchanger 2 is supplied to the indoor heat exchanger 4 in a refrigerant deficient state, so that the amount of refrigerant in the outdoor heat exchanger 2 and the amount of refrigerant in the indoor heat exchanger 4 are maintained at appropriate values. The refrigerant deficient state of the indoor heat exchanger 4 is determined by the following conditions.

Figure 5:
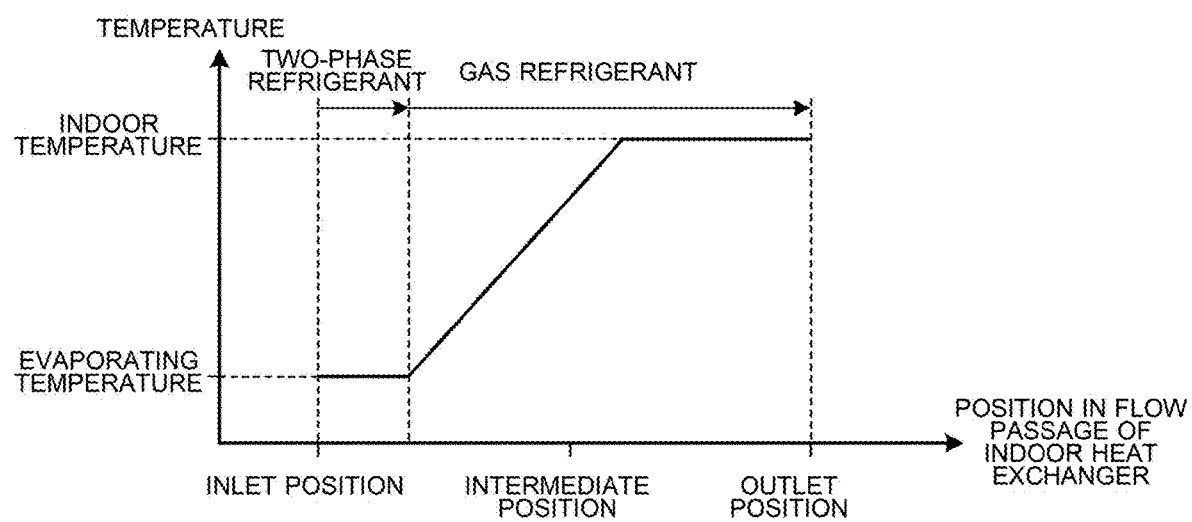
FIG. 5 is a graph illustrating the temperature of refrigerant in an indoor heat exchanger in a low-outside-air-temperature cooling operation mode of the air-conditioning apparatus according to the embodiment.

FIG. 5 is a graph illustrating the temperature of refrigerant in the indoor heat exchanger 4 in the low-outside-air-temperature cooling operation mode of the air-conditioning apparatus 100 according to the embodiment. In FIG. 5, temperature is shown on the vertical axis, and the position in the flow passage of the indoor heat exchanger 4 is shown on the horizontal axis.

As shown in FIG. 5, the temperature of refrigerant that flows into the indoor heat exchanger 4 rises from the inlet position toward the outlet position of the refrigerant flow passage. In the refrigerant deficient state of the indoor heat exchanger 4, two-phase refrigerant that flows into the indoor heat exchanger 4 immediately becomes gas refrigerant and hence, the gradient of rise in the temperature of refrigerant is smaller than that in the normal case. The state of refrigerant in this case corresponds to the states from point (c) to point (d) in FIG. 3. Refrigerant at the inlet position of the refrigerant flow passage of the indoor heat exchanger 4 is two-phase refrigerant, and the temperature of the refrigerant at the inlet position is equal to a saturated evaporating temperature. The temperature of refrigerant at the outlet position of the refrigerant flow passage of the indoor heat exchanger 4 is equal to an indoor temperature.

Therefore, a deficiency of refrigerant in the indoor heat exchanger 4 can be determined, as a first condition, from a temperature difference between the temperature of refrigerant at the intermediate position of the refrigerant flow passage of the indoor heat exchanger 4 and the temperature of refrigerant at the outlet position of the refrigerant flow passage of the indoor heat exchanger 4. When a dry state in the indoor heat exchanger 4 is determined, control of increasing the opening degree of the pressure reducing device 3 is performed to supply refrigerant from the outdoor heat exchanger 2 to the indoor heat exchanger 4. With such control, a deficiency of refrigerant in the indoor heat exchanger 4 is eliminated.

Further, in the refrigerant deficient state of the indoor heat exchanger 4, a gas refrigerant dry state is established from the intermediate position to the outlet position of the refrigerant flow passage of the indoor heat exchanger 4. Two-phase refrigerant that flows into the indoor heat exchanger 4 immediately becomes gas refrigerant, so that the temperature of the refrigerant rises and hence, a difference between the temperature of refrigerant at the intermediate position of the refrigerant flow passage of the indoor heat exchanger 4 and an indoor temperature is smaller than a difference between the temperature of refrigerant at the inlet position and the indoor temperature.

Therefore, a deficiency of refrigerant in the indoor heat exchanger 4 can be determined, as a second condition, from a temperature difference between the temperature of refrigerant at the intermediate position of the refrigerant flow passage of the indoor heat exchanger 4 and an indoor temperature. When a dry state in the indoor heat exchanger 4 is determined, control of increasing the opening degree of the pressure reducing device 3 is performed to supply refrigerant from the outdoor heat exchanger 2 to the indoor heat exchanger 4. With such control, a deficiency of refrigerant in the indoor heat exchanger 4 is eliminated.

As described above, by determining a dry state of the indoor heat exchanger 4 based on the above-mentioned condition and then by increasing the opening degree of the pressure reducing device 3, refrigerant is supplied from the outdoor heat exchanger 2 to the indoor heat exchanger 4 and hence, a deficiency of refrigerant in the indoor heat exchanger 4 is eliminated.

Figure 6:
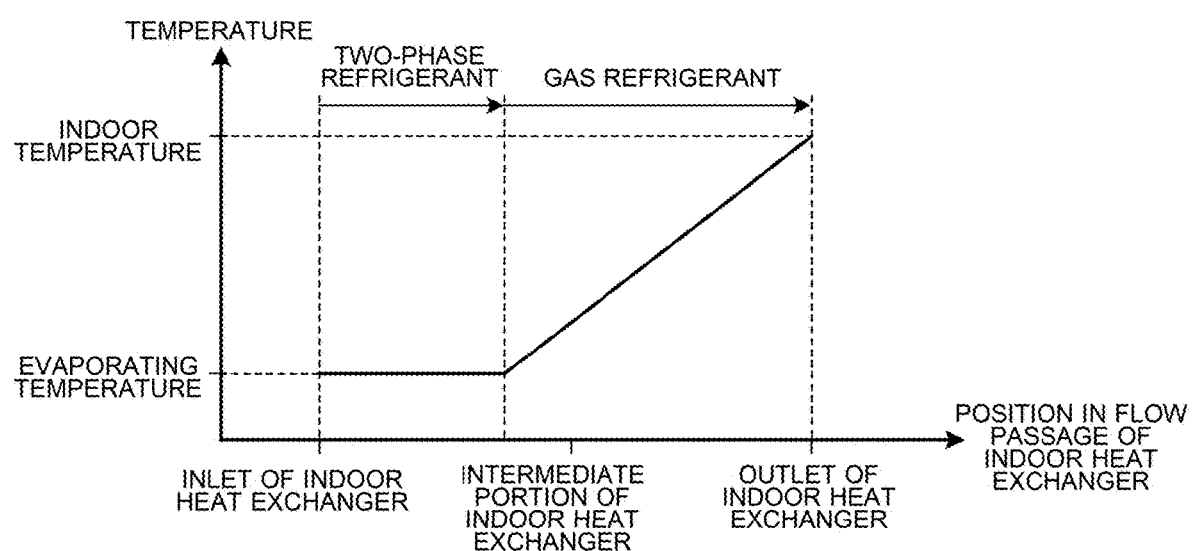
FIG. 6 is a graph illustrating a case in which the amount of refrigerant in the indoor heat exchanger becomes excessively large in the low-outside-air-temperature cooling operation mode of the air-conditioning apparatus according to the embodiment.

FIG. 6 is a graph illustrating a case in which the amount of refrigerant in the indoor heat exchanger 4 becomes excessively large in the low-outside-air-temperature cooling operation mode of the air-conditioning apparatus 100 according to the embodiment. In FIG. 6, in the same manner as FIG. 5, temperature is shown on the vertical axis, and the position in the flow passage of the indoor heat exchanger 4 is shown on the horizontal axis.

In the case in which the opening degree of the pressure reducing device 3 is increased to eliminate a deficiency of refrigerant in the indoor heat exchanger 4, it can be considered that the amount of refrigerant in the indoor heat exchanger 4 becomes excessively large. In the case in which the amount of refrigerant in the indoor heat exchanger 4 is excessively large, there is almost no temperature difference between the temperature of refrigerant at the intermediate position of the refrigerant flow passage of the indoor heat exchanger 4 and the temperature of refrigerant at the outlet position of the refrigerant flow passage of the indoor heat exchanger 4. Alternatively, due to a pressure loss, the temperature of refrigerant at the outlet position of the refrigerant flow passage of the indoor heat exchanger 4 is lower than the temperature of refrigerant at the intermediate position of the refrigerant flow passage of the indoor heat exchanger 4.

Accordingly, an excessively large amount of refrigerant in the indoor heat exchanger 4 can be determined based on a temperature difference between the temperature of refrigerant at the intermediate position of the refrigerant flow passage of the indoor heat exchanger 4 and the temperature of refrigerant at the outlet position of the refrigerant flow passage of the indoor heat exchanger 4. When the amount of refrigerant in the indoor heat exchanger 4 is excessively large, the pressure reducing device 3 is controlled in the direction in which the opening degree of the pressure reducing device 3 is decreased. To allow the pressure reducing device 3 to have hysteresis, the range of a decrease in the opening degree of the pressure reducing device 3 may be greater than the range of an increase in the opening degree of the pressure reducing device 3 determined by the first condition.

When the pressure reducing device 3 is controlled in the direction in which the opening degree of the pressure reducing device 3 is decreased, an excessively large amount of refrigerant in the indoor heat exchanger 4 is eliminated as shown in FIG. 6 and hence, a situation in which refrigerant is not fully evaporated in the indoor heat exchanger 4, so that liquid refrigerant is supplied to the compressor 1 is prevented. Accordingly, a situation in which a large amount of liquid refrigerant is returned to the compressor 1, thus causing seizure of the shaft, leading to failure of the compressor 1 is suppressed, or a situation in which refrigerant is not fully evaporated in the indoor heat exchanger 4, so that refrigerant in a two-phase state flows is suppressed When a deficiency of refrigerant in the indoor heat exchanger 4 is not determined based on the first condition and the second condition and an excessively large amount of refrigerant in the indoor heat exchanger 4 is not determined, it is determined that the amount of refrigerant in the indoor heat exchanger 4 is normal, and the opening degree of the pressure reducing device 3 is maintained. That is, the opening degree of the pressure reducing device 3 is maintained when a temperature difference between the temperature of refrigerant at the intermediate position of the refrigerant flow passage of the indoor heat exchanger 4 and the temperature of refrigerant at the outlet position of the refrigerant flow passage of the indoor heat exchanger 4 is normal and a temperature difference between the temperature of refrigerant at the intermediate position of the refrigerant flow passage of the indoor heat exchanger 4 and an indoor temperature is appropriate.

<Action of Controller 90>

Figure 7:
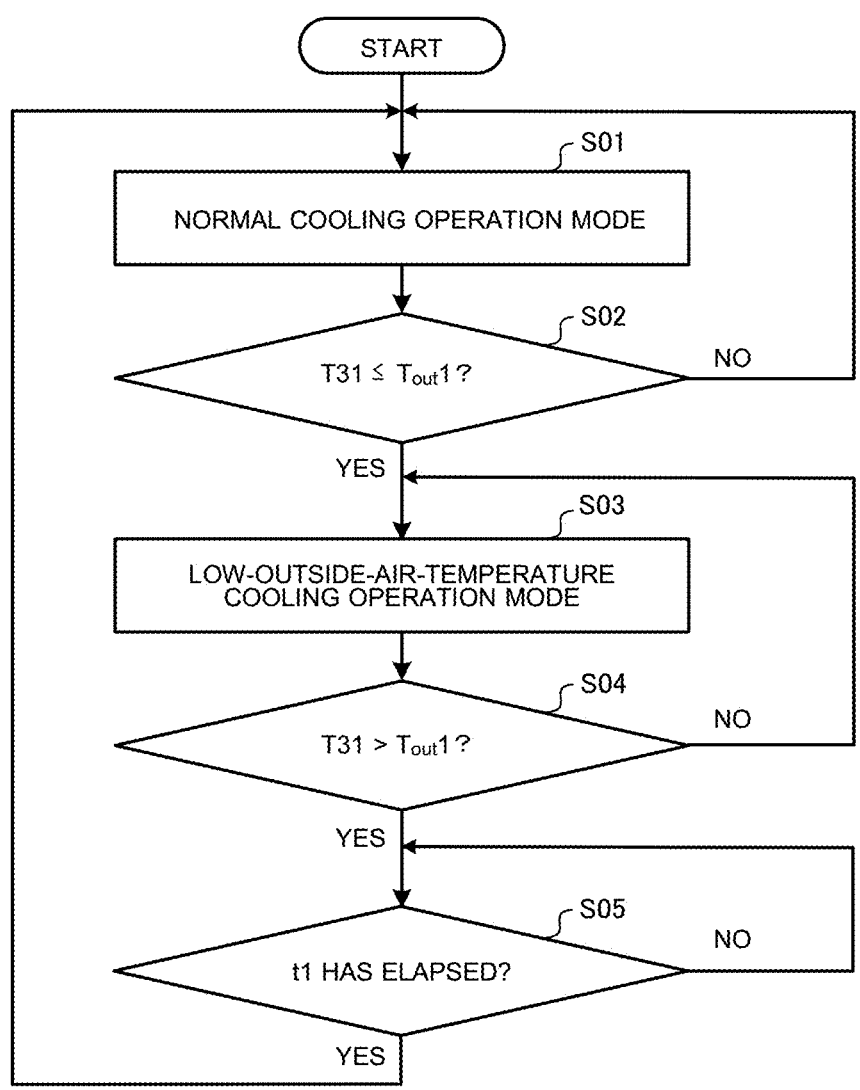
FIG. 7 is a flowchart for control performed by a controller of the air-conditioning apparatus according to the embodiment.

FIG. 7 is a flowchart for control performed by the controller 90 of the air-conditioning apparatus 100 according to the embodiment. The controller 90 performs an operation in the normal cooling operation mode or the low-outside-air-temperature cooling operation mode based on the measured value T31 from the outdoor air temperature sensor 31.

As shown in FIG. 7, when the air-conditioning apparatus 100 is activated, in step S01, the controller 90 controls the air-conditioning apparatus 100 in the normal cooling operation mode, and then advances to step S02.

In step S02, the controller 90 determines whether or not the measured value T31 from the outdoor air temperature sensor 31 is equal to or less than the control start temperature $T_{out}1$. When the controller 90 determines in step S02 that the measured value T31 from the outdoor air temperature sensor 31 is not equal to or less than the control start temperature $T_{out}1$ (No in step S02), the controller 90 returns to step S01 to continue the normal cooling operation mode. When the controller 90 determines in step S02 that the measured value T31 from the outdoor air temperature sensor 31 is equal to or less than the control start temperature $T_{out}1$ (Yes in step S02), the controller 90 advances to step S03 where the low-outside-air-temperature cooling operation mode is started, and the controller 90 then advances to step S04. The control start temperature $T_{out}1$ is one example of a predetermined value.

In step S04, the controller 90 determines whether or not the measured value T31 from the outdoor air temperature sensor 31 is greater than the control start temperature $T_{out}1$. When the controller 90 determines in step S04 that the measured value T31 from the outdoor air temperature sensor 31 is not greater than the control start temperature $T_{out}1$ (No in step S04), the controller 90 returns to step S03 to continue the low-outside-air-temperature cooling operation mode. When the controller 90 determines in step S04 that the measured value T31 from the outdoor air temperature sensor 31 is greater than the control start temperature $T_{out}1$ (Yes in step S04), the controller 90 advances to step S05.

In step S05, the controller 90 determines whether or not the first time period t1 has elapsed from a point of time in which it is determined in step S04 that the measured value T31 from the outdoor air temperature sensor 31 is greater than the control start temperature $T_{out}1$. When the controller 90 determines in step S05 that the first time period t1 has not elapsed (No in step S05), processing is continued until the first time period t1 elapses. When the controller 90 determines in step S05 that the first time period t1 has elapsed (Yes in step S05), the controller 90 returns to step S01 to start the normal cooling operation mode again. The first time period t1 is one example of a fixed time period.

Figure 8:
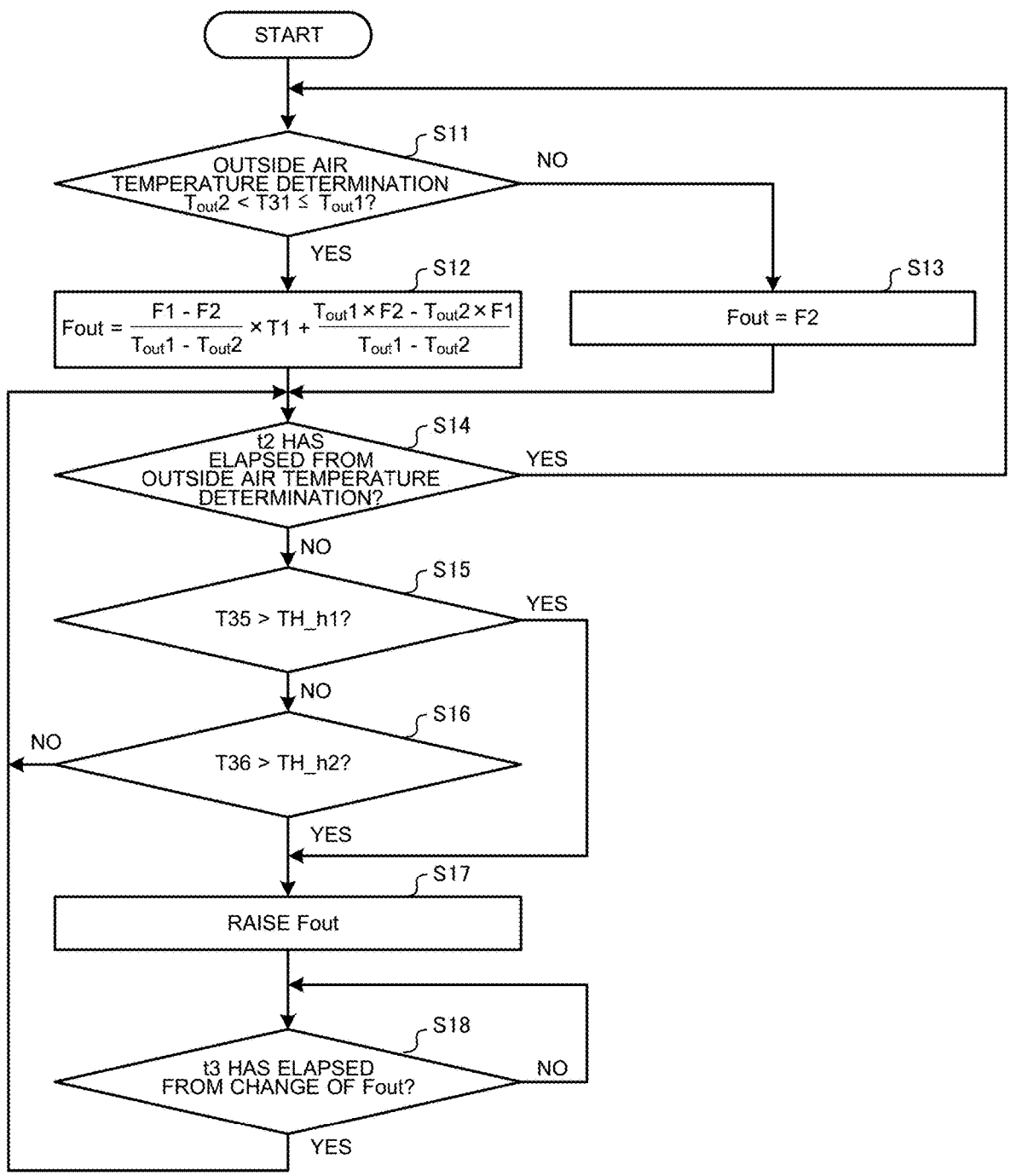
FIG. 8 is a flowchart for control of the outdoor fan performed by the controller of the air-conditioning apparatus according to the embodiment.

FIG. 8 is a flowchart for control of the outdoor fan 20 performed by the controller 90 of the air-conditioning apparatus 100 according to the embodiment. As shown in FIG. 8, when the measured value T31 from the outdoor air temperature sensor 31 is equal to or less than the control start temperature $T_{out}1$, the controller 90 starts the low-outside-air-temperature cooling operation mode.

In step S11, the controller 90 performs an outside air temperature determination, that is, determines whether or not the measured value T31 from the outdoor air temperature sensor 31 is equal to or less than the control start temperature $T_{out}1$ and is greater than the fan rotation speed lower limit temperature $T_{out}2$. When the controller 90 determines in step S11 that the measured value T31 from the outdoor air temperature sensor 31 is equal to or less than the control start temperature $T_{out}1$ and is greater than the fan rotation speed lower limit temperature $T_{out}2$ (Yes in step S11), the controller 90 advances to step S12. In step S12, the controller 90 controls the rotation speed Fout of the outdoor fan 20 based on the above-described Formula 1, and then advances to step S14.

When the controller 90 determines in step S11 that the measured value T31 from the outdoor air temperature sensor 31 is equal to or less than the fan rotation speed lower limit temperature $T_{out}2$ (No in step S11), the controller 90 advances to step S13. In step S13, the controller 90 controls the rotation speed Fout of the outdoor fan 20 to the lower limit fan rotation speed F2 based on the above-described Formula 2, and then advances to step S14. In step S14, the controller 90 determines whether or not the second time period t2 has elapsed from the outside air temperature determination. When the controller 90 determines in step S14 that the second time period t2 has not elapsed from the outside air temperature determination (No in step S14), the controller 90 advances to step S15.

In step S15, the controller 90 determines whether or not the measured value T35 from the outdoor heat exchanger intermediate temperature sensor 35 of the outdoor heat exchanger 2 is greater than the threshold TH_h1 of the outdoor heat exchanger intermediate temperature. When the controller 90 determines in step S15 that the measured value T35 from the outdoor heat exchanger intermediate temperature sensor 35 of the outdoor heat exchanger 2 is greater than the threshold TH_h1 of the outdoor heat exchanger intermediate temperature (Yes in step S15), the controller 90 advances to step S17. When the controller 90 determines in step S15 that the measured value T35 from the outdoor heat exchanger intermediate temperature sensor 35 of the outdoor heat exchanger 2 is equal to or less than the threshold TH_h1 of the outdoor heat exchanger intermediate temperature (No in step S15), the controller 90 advances to step S16. The threshold TH_h1 of the outdoor heat exchanger intermediate temperature is one example of the fourth threshold.

In step S16, the controller 90 determines whether or not the measured value T36 from the controller temperature sensor 36 is greater than the threshold TH_h2 of a controller temperature. When the controller 90 determines in step S16 that the measured value T36 from the controller temperature sensor 36 is smaller than the predetermined value (No in step S16), the controller 90 returns to step S14. When the controller 90 determines in step S16 that the measured value T36 from the controller temperature sensor 36 is greater than the threshold TH_h2 of the controller temperature (Yes in step S16), the controller 90 advances to step S17. The threshold TH_h2 of the controller temperature is one example of the fifth threshold.

In step S17, the controller 90 raises the rotation speed Fout of the outdoor fan 20, and then advances to step S18. In step S18, the controller 90 determines whether or not the third time period t3 has elapsed from when the rotation speed Fout of the outdoor fan 20 is changed. When the controller 90 determines in step S18 that the third time period t3 has not elapsed from when the rotation speed Fout of the outdoor fan 20 is raised (No in step S18), the controller 90 maintains the rotation speed Fout of the outdoor fan 20. When the controller 90 determines in step S18 that the third time period t3 has elapsed from when the rotation speed Fout of the outdoor fan 20 is raised (Yes in step S18), the controller 90 returns to step S14.

When the controller 90 determines in step S14 that the second time period t2 has elapsed (Yes in step S14), the controller 90 returns to step S11, and processing is repeated until the low-outside-air-temperature cooling operation mode ends.

Figure 9:
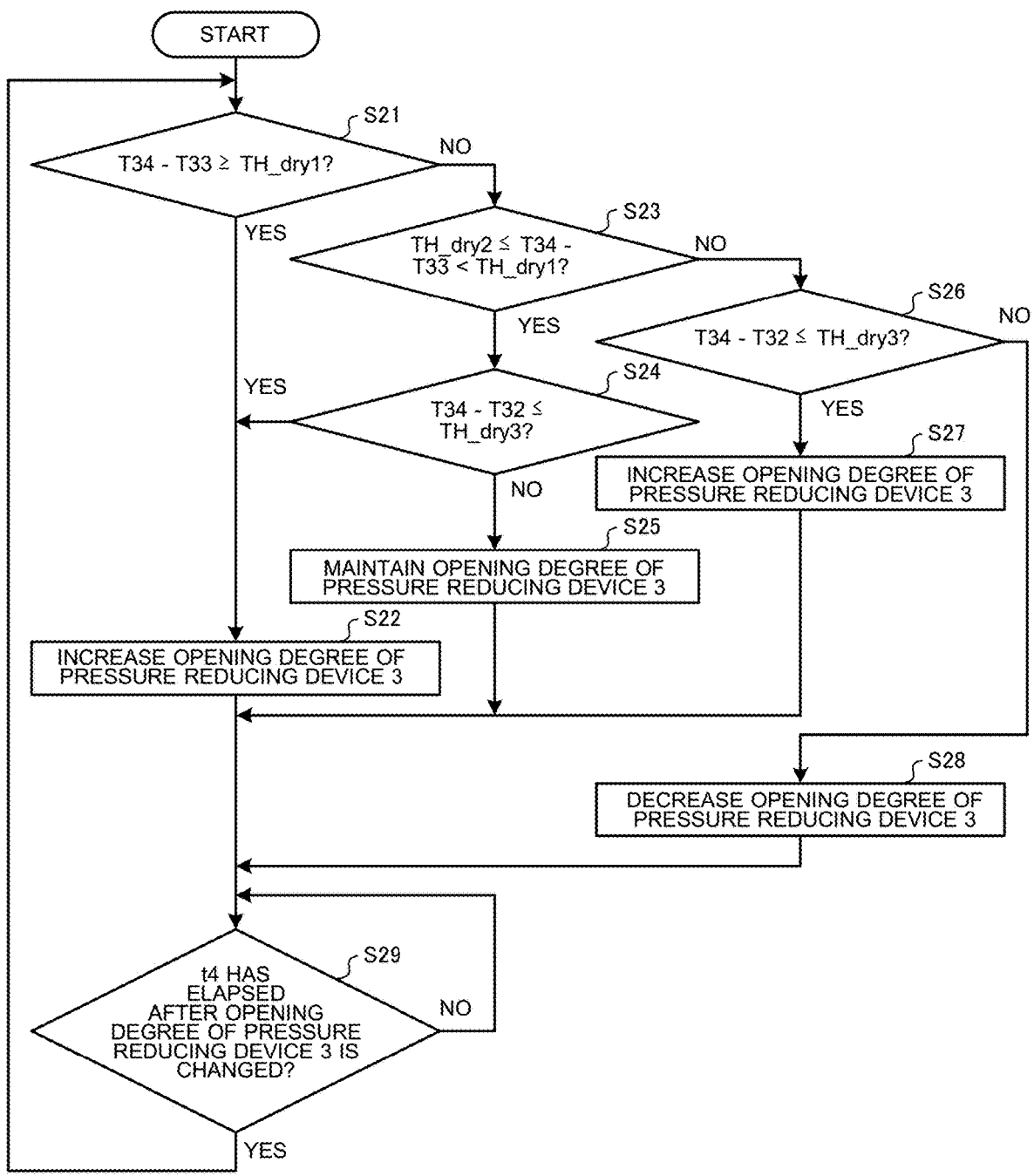
FIG. 9 is a flowchart for control of a pressure reducing device performed by the controller of the air-conditioning apparatus according to the embodiment.

FIG. 9 is a flowchart for control of the pressure reducing device 3 performed by the controller 90 of the air-conditioning apparatus 100 according to the embodiment. As shown in FIG. 9, when the low-outside-air-temperature cooling operation mode is started, the controller 90 advances to step S21.

In step S21, the controller 90 determines whether or not a temperature difference T34-T33 between a measured value T34 from the indoor heat exchanger outlet temperature sensor 34 and a measured value T33 from the indoor heat exchanger intermediate temperature sensor 33 is equal to or greater than a first threshold TH_dry1. When the controller 90 determines in step S21 that the temperature difference T34-T33 is equal to or greater than the first threshold TH_dry1 (YES in step S21), the controller 90 advances to step S22. In contrast, when the controller 90 determines in step S21 that the temperature difference T34-T33 is less than the first threshold TH_dry1 (No in step S21), the controller 90 advances to step S23.

In step S23, the controller 90 determines whether or not the temperature difference T34-T33 is equal to or greater than a second threshold TH_dry2. The second threshold TH_dry2 is a value smaller than the first threshold TH_dry1.

When the controller 90 determines in step S23 that the temperature difference T34-T33 is equal to or greater than the second threshold TH_dry2 (Yes in step S23), the controller 90 advances to step S24. In step S24, the controller 90 determines whether or not a temperature difference T34-T32 between the measured value T34 from the indoor heat exchanger outlet temperature sensor 34 and a measured value T32 from the indoor temperature sensor 32 is equal to or less than a third threshold TH_dry3. When the controller 90 determines in step S24 that the temperature difference T34-T32 is equal to or less than the third threshold TH_dry3 (Yes in step S24), the controller 90 advances to step S22.

In step S22, the controller 90 controls the pressure reducing device 3 in the direction in which the opening degree of the pressure reducing device 3 is increased, and the controller 90 then advances to step S29.

When the controller 90 determines in step S24 that the temperature difference T34-T32 is greater than the third threshold TH_dry3 (No in step S24), the controller 90 advances to step S25. In step S25, the controller 90 maintains the opening degree of the pressure reducing device 3, and then advances to step S29.

In contrast, when the controller 90 determines in step S23 that the temperature difference T34-T32 is less than the second threshold TH_dry2 (No in step S23), the controller 90 advances to step S26.

In step S26, the controller 90 determines whether or not the temperature difference T34-T32 is equal to or less than the third threshold TH_dry3. When the controller 90 determines in step S26 that the temperature difference T34-T32 is equal to or less than the third threshold TH_dry3 (Yes in step S26), the controller 90 advances to step S27. In step S27, the controller 90 controls the pressure reducing device 3 in the direction in which the opening degree of the pressure reducing device 3 is increased, and the controller 90 then advances to step S29.

When the controller 90 determines in step S26 that the temperature difference T34-T32 is greater than the third threshold TH_dry3 (No in step S26), the controller 90 advances to step S28. In step S28, the controller 90 controls the pressure reducing device 3 in the direction in which the opening degree of the pressure reducing device 3 is decreased, and the controller 90 then advances to step S29.

In step S29, the controller 90 determines whether or not a fourth time period t4 has elapsed after the opening degree of the pressure reducing device 3 is changed. When the controller 90 determines in step S29 that the fourth time period t4 has not elapsed after the opening degree of the pressure reducing device 3 is changed (No in step S29), the controller 90 repeats step S29 until the third time period elapses.

When the controller 90 determines in step S29 that the fourth time period t4 has elapsed after the opening degree of the pressure reducing device 3 is changed (Yes in step S29), the controller 90 returns to step S21, and processing is repeated until the low-outside-air-temperature cooling operation mode ends.

Operation conditions for control of the opening degree of the pressure reducing device 3 performed by the controller 90 can be summarized as A to E described below.

A. When the temperature difference T34-T33 is equal to or greater than the first threshold TH_dry1 (Yes in step S21), the controller 90 increases the opening degree of the pressure reducing device 3.
B. When the temperature difference T34-T33 is less than the first threshold TH_dry1 and equal to or greater than the second threshold TH_dry2 and the temperature difference T34-T32 is equal to or less than the third threshold TH_dry3 (Yes in step S24), the controller 90 increases the opening degree of the pressure reducing device 3.
C. When the temperature difference T34-T33 is less than the first threshold TH_dry1 and equal to or greater than the second threshold TH_dry2 and the temperature difference T34-T32 is greater than the third threshold TH_dry3 (No in step S24), the controller 90 maintains the opening degree of the pressure reducing device 3.
D. When the temperature difference T34-T33 is less than the second threshold TH_dry2 and the temperature difference T34-T32 is equal to or less than the third threshold TH_dry3 (Yes in step S26), the controller 90 increases the opening degree of the pressure reducing device 3.
E. When the temperature difference T34-T33 is less than the second threshold TH_dry2 and the temperature difference T34-T32 is greater than the third threshold TH_dry3 (No in step S26), the controller 90 decreases the opening degree of the pressure reducing device 3.

As described above, the controller 90 determines a dry state of the indoor heat exchanger 4, and then controls the opening degree of the pressure reducing device 3 to achieve an appropriate amount of refrigerant supplied from the outdoor heat exchanger 2 to the indoor heat exchanger 4.

The controller 90 of the air-conditioning apparatus 100 may further has a configuration that performs control of raising the lower limit value of frequency of the compressor 1 when the measured value from the outdoor air temperature sensor 31 is less than the control start temperature $T_{out}1$. In the cooling operation under a low outside air temperature condition, density of refrigerant suctioned into the compressor 1 reduces with a reduction in the evaporating temperature in the room and hence, the amount of cycling of refrigerant decreases. As a result, refrigerant easily stagnates in the outdoor heat exchanger 2. Therefore, in the low-outside-air-temperature cooling operation mode, by increasing the amount of cycling of refrigerant by raising the lower limit value of frequency of the compressor 1, it is possible to suppress stagnation of refrigerant in the outdoor heat exchanger 2.

In the air-conditioning apparatus 100 according to the embodiment described above, in the low-outside-air-temperature cooling operation mode, the rotation speed Fout of the outdoor fan 20 is reduced, and a deficiency of refrigerant in the indoor heat exchanger 4 is determined based on a difference between the measured value from the indoor heat exchanger intermediate temperature sensor 33 and the measured value from the indoor heat exchanger outlet temperature sensor 34. When a difference between the measured value from the indoor heat exchanger intermediate temperature sensor 33 and the measured value from the indoor heat exchanger outlet temperature sensor 34 is equal to or greater than the first threshold, it is determined that the indoor heat exchanger 4 is in a refrigerant deficient state. Therefore, the opening degree of the pressure reducing device 3 is increased to appropriately adjust distribution of the amount of refrigerant in the outdoor heat exchanger 2 and the indoor heat exchanger 4. With such a configuration, stagnation of refrigerant in the outdoor heat exchanger 2 is eliminated and hence, a stable cooling operation is achieved in a low outside air temperature environment.

Further, the outdoor fan 20 is controlled such that the rotation speed Fout of the outdoor fan 20 is continuously reduced and hence, there is no possibility of an extreme reduction in the rotation speed of the outdoor fan 20. Accordingly, it is possible to reduce the possibility of the compressor 1 stopping protection, or the possibility of thermal runaway caused by an increase in the temperature of the controller 90.

A dry state of the indoor heat exchanger 4 caused by a deficiency of refrigerant is determined based on a difference between the measured value from the indoor heat exchanger intermediate temperature sensor 33 and the measured value from the indoor heat exchanger outlet temperature sensor 34, and the opening degree of the pressure reducing device 3 is then increased. Therefore, cooling capacity of the air-conditioning apparatus 100 is restored and hence, stagnation of refrigerant in the outdoor heat exchanger 2 is eliminated. Accordingly, a stable cooling operation is achieved in a low outside air temperature environment.

The opening degree of the pressure reducing device 3 is decreased based on a difference between the measured value from the indoor temperature sensor 32 and the measured value from the indoor heat exchanger intermediate temperature sensor 33 and hence, refrigerant in the indoor heat exchanger 4 evaporates while avoiding an extremely large amount of refrigerant in the indoor heat exchanger 4 occurring. Accordingly, a situation in which liquid refrigerant is supplied to the compressor 1 is avoided.

The opening degree of the pressure reducing device 3 is maintained based on a difference between the measured value from the indoor heat exchanger intermediate temperature sensor 33 and the measured value from the indoor heat exchanger outlet temperature sensor 34 and a difference between the measured value from the indoor temperature sensor 32 and the measured value from the indoor heat exchanger intermediate temperature sensor 33 and hence, a state in which the amount of refrigerant in the indoor heat exchanger 4 is normal is maintained.

By setting a range of a decrease in the opening degree of the pressure reducing device 3 to be greater than a range of an increase in the opening degree of the pressure reducing device 3 to cause the pressure reducing device 3 to have hysteresis, it is possible to surely decrease the opening degree of the pressure reducing device 3.

The low-outside-air-temperature cooling operation mode ends after a lapsed of the first time period t1 from when a state is established in which the measured value from the outdoor air temperature sensor 31 is greater than the control start temperature $T_{out}1$. Accordingly, a state in which operation capacity is reduced does not last for a long time period.

When the measured value from the outdoor heat exchanger intermediate temperature sensor 35 is greater than the threshold TH_h1 of the outdoor heat exchanger intermediate temperature, the rotation speed of the outdoor fan 20 is raised and hence, a situation in which the compressor 1 stops protection is avoided.

When the measured value from the controller temperature sensor 36 is greater than the threshold TH_h2 of the controller temperature, the rotation speed of the outdoor fan 20 is raised. Accordingly, the possibility that the temperature of the controller 90 rises, leading to runaway of control performed by the controller 90 is reduced.

It is preferable that the upper limit value of the rotational speed of the outdoor fan 20 be the half value of the upper limit value of the rotation speed of the outdoor fan 20 before a start of the low-outside-air-temperature cooling operation mode.

When the measured value from the outdoor air temperature sensor 31 is less than a predetermined value, the lower limit value of frequency of the compressor 1 is raised. Accordingly, the amount of cycling of refrigerant is increased and hence, it is possible to suppress stagnation of refrigerant in the outdoor heat exchanger 2. By raising the lower limit value of frequency of the compressor 1, it is possible to avoid a situation in which the compressor 1 stops protection in the low-outside-air-temperature cooling operation mode.

REFERENCE SIGNS LIST

1: compressor, 2: outdoor heat exchanger, 3: pressure reducing device, 4: indoor heat exchanger, 11: first extension pipe, 12: second extension pipe, 20: outdoor fan, 21: indoor fan, 31: outdoor air temperature sensor, 32: indoor temperature sensor, 33: indoor heat exchanger intermediate temperature sensor, 34: indoor heat exchanger outlet temperature sensor, 35: outdoor heat exchanger intermediate temperature sensor, 36: controller temperature sensor, 90: controller, 100: air-conditioning apparatus, A: outdoor unit, B: indoor unit

The invention claimed is:

1. An air-conditioning apparatus comprising:
   a refrigerant circuit in which a compressor, an outdoor heat exchanger, a pressure reducing device, and an indoor heat exchanger are connected in sequence by a pipe, and configured to allow refrigerant to cycle through the refrigerant circuit;
   an outdoor fan configured to send air to the outdoor heat exchanger;
   an outdoor air temperature sensor configured to measure a temperature of outside air;
   an indoor heat exchanger intermediate temperature sensor configured to measure a temperature of refrigerant flowing through an intermediate portion of the indoor heat exchanger;
   an indoor heat exchanger outlet temperature sensor configured to measure a temperature of refrigerant flowing through an outlet of the indoor heat exchanger; and
   a controller configured to, when a measured value from the outdoor air temperature sensor is equal to or less than a predetermined value, perform a low-outside-air-temperature cooling operation mode, wherein
   in the low-outside-air-temperature cooling operation mode,
   the controller is configured to reduce a rotation speed of the outdoor fan, and to, when a difference between a measured value from the indoor heat exchanger outlet temperature sensor and a measured value from the indoor heat exchanger intermediate temperature sensor is equal to or greater than a first threshold, increase an opening degree of the pressure reducing device.

2. The air-conditioning apparatus of claim 1, wherein the controller is configured to continuously reduce the rotation speed of the outdoor fan in the low-outside-air-temperature cooling operation mode.

3. The air-conditioning apparatus of claim 1, further comprising an indoor temperature sensor configured to measure an indoor temperature, wherein
   in the low-outside-air-temperature cooling operation mode, the controller is configured to, when the difference between the measured value from the indoor heat exchanger outlet temperature sensor and the measured value from the indoor heat exchanger intermediate temperature sensor is equal to or greater than the first threshold and a difference between the measured value from the indoor heat exchanger outlet temperature sensor and a measured value from the indoor temperature sensor is equal to or less than a third threshold, increase the opening degree of the pressure reducing device.

4. The air-conditioning apparatus of claim 3, wherein
in the low-outside-air-temperature cooling operation mode,
the controller is configured to, when the difference between the measured value from the indoor heat exchanger outlet temperature sensor and the measured value from the indoor heat exchanger intermediate temperature sensor is less than a second threshold, which is smaller than the first threshold, and the difference between the measured value from the indoor heat exchanger outlet temperature sensor and the measured value from the indoor temperature sensor is greater than the third threshold, decrease the opening degree of the pressure reducing device.

5. The air-conditioning apparatus of claim 4, wherein
in the low-outside-air-temperature cooling operation mode,
the controller is configured to, when the difference between the measured value from the indoor heat exchanger outlet temperature sensor and the measured value from the indoor heat exchanger intermediate temperature sensor is equal to or greater than the second threshold and less than the first threshold, and a difference between the measured value from the indoor heat exchanger outlet temperature sensor is greater than the third threshold, maintain the opening degree of the pressure reducing device.

6. The air-conditioning apparatus of claim 1, wherein
a range of a decrease in the opening degree of the pressure reducing device is greater than a range of an increase in the opening degree of the pressure reducing device.

7. The air-conditioning apparatus of claim 1, wherein
in the low-outside-air-temperature cooling operation mode, the controller is configured to end the low-outside-air-temperature cooling operation mode after a lapse of a fixed time period from when a state is established in which the measured value from the outdoor air temperature sensor is greater than the predetermined value.

8. The air-conditioning apparatus of claim 1, further comprising an outdoor heat exchanger intermediate temperature sensor configured to measure a temperature of refrigerant flowing through an intermediate portion of the outdoor heat exchanger, wherein
in the low-outside-air-temperature cooling operation mode,
the controller is configured to, when a measured value from the outdoor heat exchanger intermediate temperature sensor is equal to or greater than a fourth threshold, raise the rotation speed of the outdoor fan.

9. The air-conditioning apparatus of claim 1, further comprising a controller temperature sensor configured to measure a temperature of the controller, wherein
in the low-outside-air-temperature cooling operation mode,
the controller is configured to, when a measured value from the controller temperature sensor is equal to or greater than a fifth threshold, raise the rotation speed of the outdoor fan.

10. The air-conditioning apparatus of claim 1, wherein
in the low-outside-air-temperature cooling operation mode,
an upper limit value of a rotational speed of the outdoor fan is a half value of an upper limit value of the rotation speed of the outdoor fan before a start of the low-outside-air-temperature cooling operation mode.

11. The air-conditioning apparatus of claim 1, wherein
a lower limit value of a frequency of the compressor is raised when the measured value from the outdoor air temperature sensor is less than the predetermined value.

* * * * *